H. E. HAYWARD.
CHAIN LINK.
APPLICATION FILED JUNE 8, 1908.
998,509.
Patented July 18, 1911.
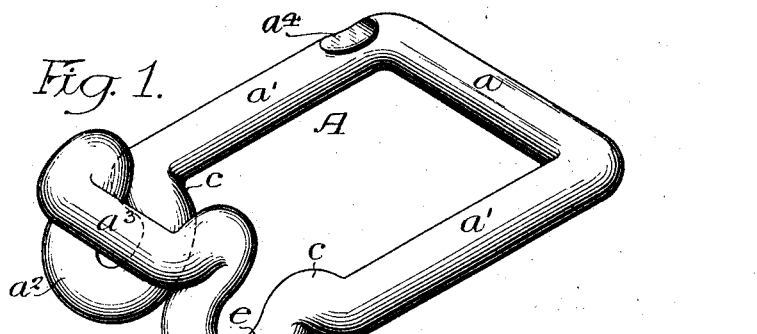
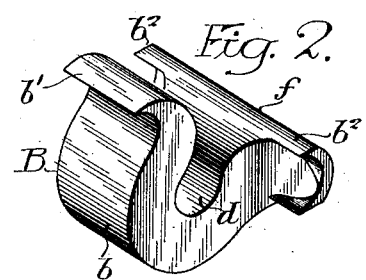
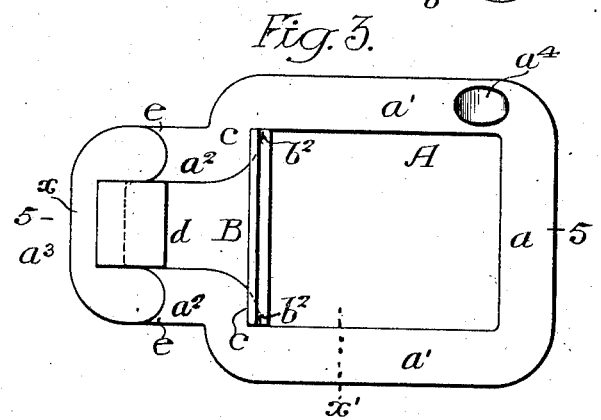
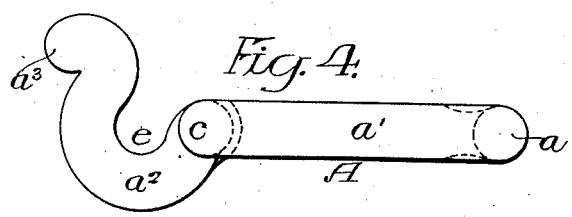
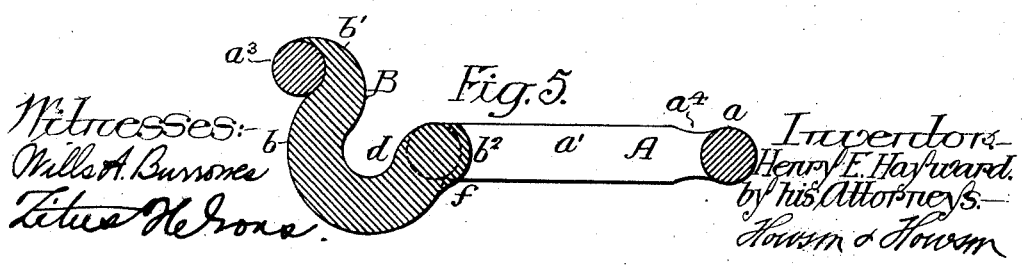
Witnesses:
Mills A. Burrows
Titus H. Irons
Inventor:
Henry E. Hayward.
by his Attorneys,
Howson & Howson

UNITED STATES PATENT OFFICE.

HENRY E. HAYWARD, OF PHILADELPHIA, PENNSYLVANIA, ASSIGNOR TO LINK-BELT COMPANY, OF CHICAGO, ILLINOIS, A CORPORATION OF ILLINOIS.

CHAIN-LINK.

998,509.  Specification of Letters Patent.  Patented July 18, 1911.

Application filed June 8, 1908. Serial No. 437,251.

*To all whom it may concern:*

Be it known that I, HENRY E. HAYWARD, a citizen of the United States, residing in Philadelphia, Pennsylvania, have invented certain Improvements in Chain-Links, of which the following is a specification.

My invention relates to certain improvements in detachable chain links and the object of my invention is to so design the link that the body portion can be made of wire, bent into proper shape, welded, and the hook reinforced by a metallic section placed in position and secured to the wire section by welding.

In the accompanying drawing:—Figure 1, is a perspective view showing the wire section of my improved link; Fig. 2, is a perspective view showing the hook section detached; Fig. 3, is a plan view of the complete link; Fig. 4, is a side view; and Fig. 5, is a section on the line 5—5, Fig. 3.

In the manufacture of detachable chain links they must be made accurately and of sufficient strength to stand not only the tensile strains but also the jar due to vibrations of the chain in passing around sprocket wheels. They must also be able to withstand the wear of the sprocket teeth against the links of the chain.

A is the body member made quadrangular in shape, having an end bar $a$ and side bars $a'$, $a'$; these two side bars are connected together by a transverse member $a^3$, the whole being made from a single piece of wire and the parts may be welded at any point desired, preferably either on the line $x$ at the hooked end of the link, or on the line $x'$ at one side of the link, Fig. 3.

B is a socket member, preferably made of a forging, and this socket member has a body portion $b$ adapted to rest between the two hooked members $a^2$ of the link, and has a lip $b'$ which extends over the cross member $a^3$ at the hook end of the link. At the rear of the socket member are lateral projections $b^2$ which rest against shoulders $c$ of the portion A and are preferably shaped to fit the particular contour of the said shoulders. The opening $d$ in the socket member alines with the slots $e$ in the hooked section of the portion A and the parts are welded together in any suitable manner. One method is to weld the lateral extensions $b^2$ to the shoulders $c$ and in some instances the lip $b'$ may be welded to the transverse bar $a^3$. This makes a very substantial link, the transverse bar $a$ of one link snugly fitting a socket in an adjoining link and the strain will be taken by the lipped portion $b'$ and the lateral projections $b^2$, and the back $f$ of the socket portion B which extends the full width of the opening will take the wear of the teeth of the sprocket wheel.

The thickness of one of the side bars $a$ of the link is reduced as at $a^4$, so that one link can be readily detached from another by simply turning it to the proper position and sliding it laterally.

It will be understood that I lay no claim to the combination in an open rectangular chain link, of side bars; each having a hook at one end and each being provided with a laterally extending shoulder adjacent its hook; with a socket member mounted between the hooks and having extensions resting against the shoulders, as this is fully covered in the application for patent filed by James M. Dodge on the 15th day of February 1909, under Serial Number 477,837, which resulted in Letters Patent No. 973,922, dated October 25th, 1910.

I claim:—

1. The combination in a chain link, of a body portion made of an endless wire bent into shape so as to form the body portion and the hook member less in width than the body portion, with a socket member mounted between the hooked portions of the link and secured thereto.

2. The combination in a chain link, of a body portion of wire bent to quadrangular form and having shoulders and hooked extensions at one end and a cross bar connecting the hooked extensions, and a socket member adapted to rest between the two hooked side members of the body portion and having a lip resting against the connecting bar and having lateral extensions resting against the shoulders on the body portion, the said lateral extensions being attached to the body portion at the shoulders.

3. In a chain link, the combination of a body portion made of wire bent into shape and the ends secured together and forming a quadrangular open section and a hooked section less in width than the open section forming shoulders, and a socket member mounted between the two hooked members and having lateral extensions resting against the shoulders, said lateral extensions being secured to the body portion at the shoulders.

In testimony whereof, I have signed my name to this specification, in the presence of two subscribing witnesses.

HENRY E. HAYWARD.

Witnesses:
Jos. H. KLEIN,
WM. A. BARR.

Copies of this patent may be obtained for five cents each, by addressing the "Commissioner of Patents, Washington, D. C."